(No Model.)  2 Sheets—Sheet 1.
E. LOVELACE.
HORSE DETACHER.
No. 550,375. Patented Nov. 26, 1895.
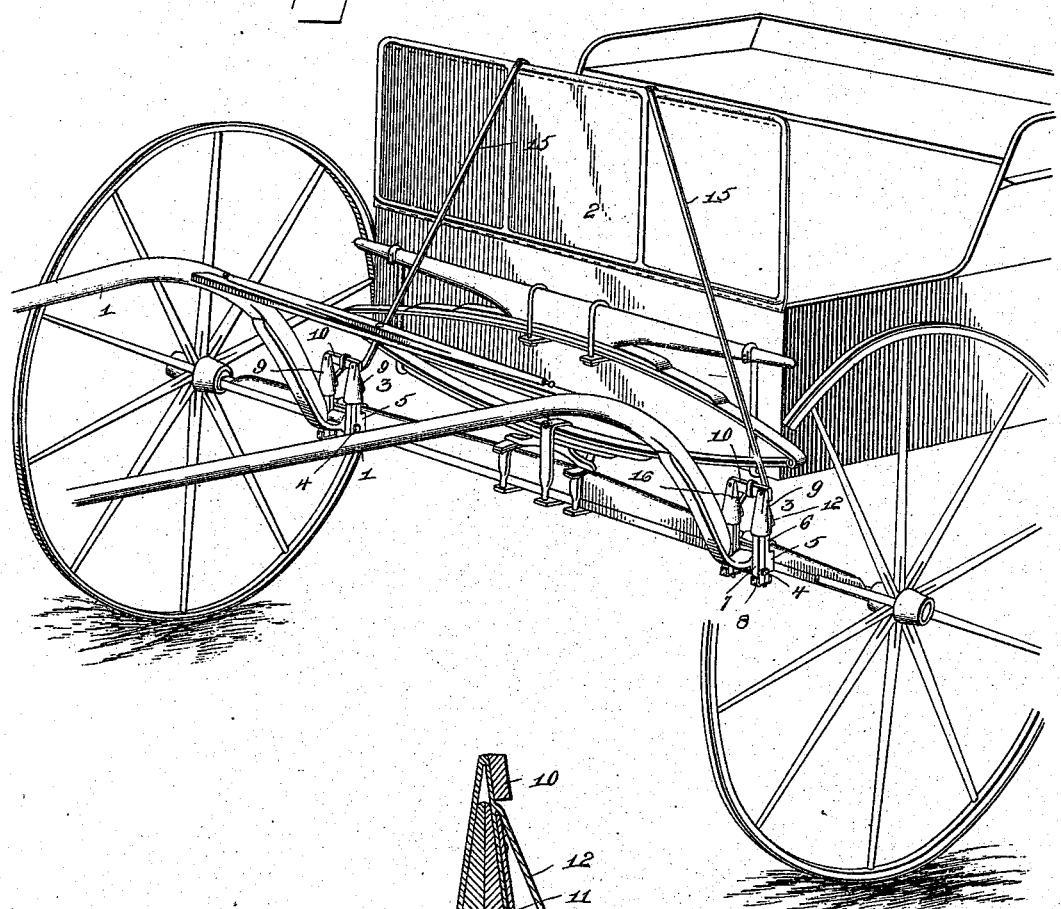
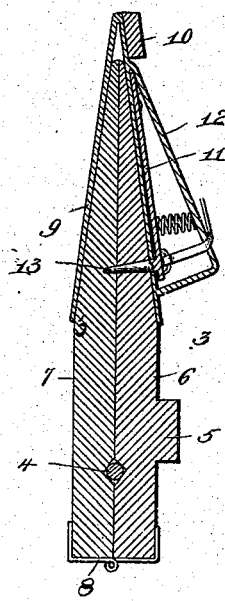
Witnesses
John C Shaw
J. F. F. Riley
Inventor
Emmett Lovelace,
By his Attorneys.
C. A. Snow & Co.

(No Model.) 2 Sheets—Sheet 2.
E. LOVELACE.
HORSE DETACHER.
No. 550,375. Patented Nov. 26, 1895.
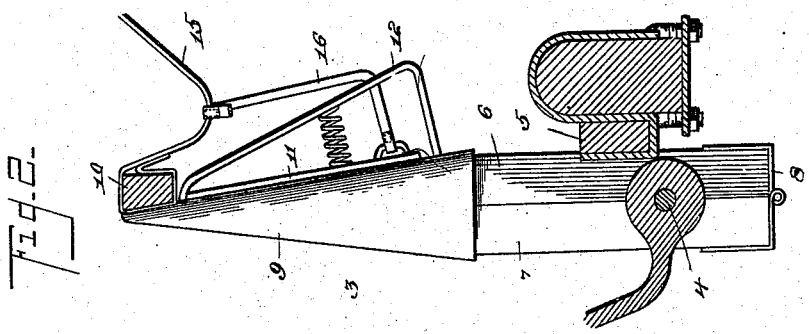
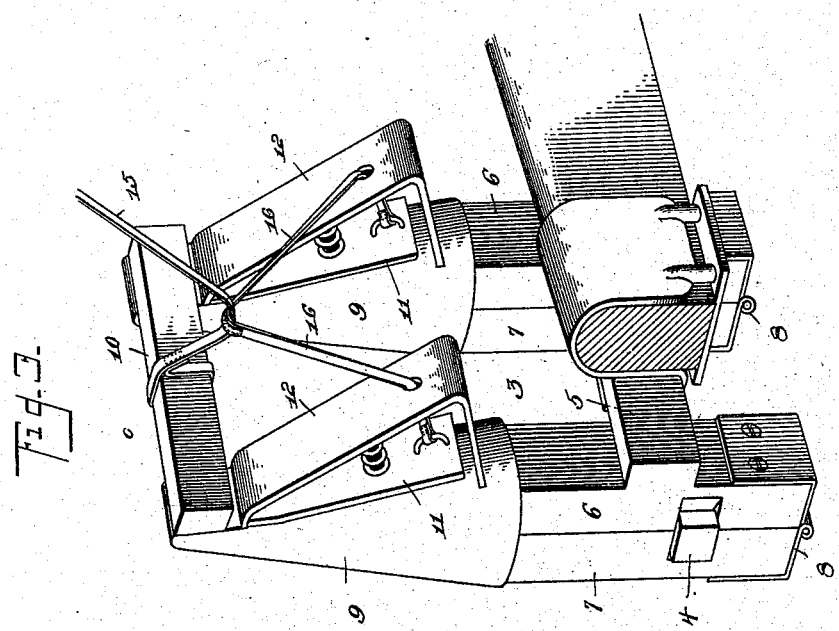
Witnesses
John C Shaw
J. F. F. Riley
Inventor
Emmett Lovelace,
By his Attorneys,
C A Snow & Co.

UNITED STATES PATENT OFFICE.

EMMETT LOVELACE, OF MARCELLINE, ILLINOIS.

HORSE-DETACHER.

SPECIFICATION forming part of Letters Patent No. 550,375, dated November 26, 1895.

Application filed June 8, 1895. Serial No. 552,160. (No model.)

*To all whom it may concern:*

Be it known that I, EMMETT LOVELACE, a citizen of the United States, residing at Marcelline, in the county of Adams and State of Illinois, have invented a new and useful Horse-Detacher, of which the following is a specification.

The invention relates to improvements in horse-detachers.

The object of the present invention is to provide simple and efficient means for coupling thills or a pole to the front axle of a vehicle and for enabling them to be readily uncoupled in case of a runaway, to disconnect the draft-animals from a vehicle, to prevent the latter or the occupants thereof from being injured.

The invention consists in the construction and novel combination and arrangement of parts hereinafter fully described, illustrated in the accompanying drawings, and pointed out in the claims hereto appended.

In the drawings, Figure 1 is a perspective view of a horse-detacher constructed in accordance with this invention and shown applied to a vehicle. Fig. 2 is a sectional view taken longitudinally of one of the shafts. Fig. 3 is a perspective view of one of the couplings detached from the axle. Fig. 4 is a vertical sectional view of one of the clamps of the coupling, the clamp being closed and the cap thereof being in position.

Like numerals of reference indicate corresponding parts in all the figures of the drawings.

1 designates a pair of shafts coupled to a vehicle 2, and each coupling comprises a pair of clamps 3, detachably holding a coupling-bolt 4 and located at opposite sides of the shaft or thill iron and connected by a cross-piece 5, which is clipped to the front axle.

The clamps 3 are arranged vertically in advance of the front axle, and each clamp is composed of a rear stationary section 6 and a front section 7, which is connected by a hinge 8 at its lower end with the bottom of the section 6, and which is adapted to swing downward to release the coupling-bolt for the purpose of freeing and detaching the shafts 1. The upper portions of the sections 6 and 7 are tapered and are normally held closed by conical caps 9, fitting over the upper tapered portions of the sections and connected by a cross-piece 10. The cross-piece 10 is located at the tops of the conical caps, and the latter are each provided with a spring-actuated catch 11.

The catch 11 consists of a flat plate arranged in a substantially L-shaped keeper 12 and secured at its upper end to the adjacent cap between the same and the upper end of the keeper, and provided at its lower end with a pin or bolt 13 passing through a perforation near the bottom of the cap, and when the latter is in position on the sections the pin or bolt 13 fits in registering perforations of the front and rear sections. A spring is interposed between the outer face of the plate of the catch and the keeper and holds the pin or bolt in the perforations of the sections to prevent the cap from being lifted off of them. The keeper consists of an inclined portion arranged at an angle to the cap and a substantially horizontal portion extending from the lower end of the inclined portion to the cap and provided with an attachment-plate. The spring-actuated catch is capable of swinging outward within the keeper to disengage its pin or bolt 13 for the purpose of permitting the cap to be removed to open the sections.

The caps are simultaneously removed from the sections by an operating-strap 15 or other suitable connection passing over the dash-board of the vehicle in order to be within convenient reach of the occupant, and having its terminals secured to the crossed bars or pieces 10, which connect the upper ends of each pair of caps. The main operating-strap is connected a short distance from its ends with the catches by short straps or connections 16 arranged in pairs and passing through perforations of the keepers and secured at their lower ends to the catches.

In event of a runaway and when it is deemed advisable to detach the horse, the main strap or connection, which is in easy reach of the driver, is pulled, which disengages the pins or bolts 13 of the catches from the perforations of the sections of the clamps, thereby freeing the caps and permitting the same to be readily lifted from the sections to allow the front sections of the clamps to swing downward to release the coupling-bolts.

The weight of the shafts will swing the front sections downward and the inner faces of each pair of sections are provided with V-shaped or angular grooves to form an opening for the coupling-bolt and to cause the same to fall readily from the rear sections when the front ones are swung downward.

It will be seen that the horse-detacher is exceedingly simple and inexpensive in construction, that it is adapted to be readily secured to any ordinary vehicle, and that it is capable of instantly uncoupling the shafts or pole of the same to detach the draft animal or animals to prevent in case of a runaway the vehicle and its occupants from being injured.

It will also be seen that the coupling enables the shafts to be readily attached to and quickly removed from the front axle of a vehicle and that they cannot become accidentally uncoupled.

Changes in the form, proportion, and the minor details of construction may be resorted to without departing from the principle or sacrificing any of the advantages of this invention.

What I claim is—

1. In a horse detacher, the combination of the vertically disposed clamps composed of front and rear sections hinged together at their lower ends and adapted to receive the coupling bolts of a pair of thills, caps fitting over the upper ends of the sections of the clamps and securing them together, catches mounted on the caps and engaging the clamps and retaining the caps in position, and operating connections for releasing the catches and removing the caps, substantially as described.

2. In a horse detacher, the combination of the vertically disposed clamps, composed of front and rear sections hinged together at their lower ends, and adapted to receive between them a coupling bolt, means for securing the clamps to a vehicle, caps removably fitting on the upper portions of the sections of the clamps and provided with keepers, spring actuated catchers mounted in the keepers and engaging the clamps and securing the caps thereon, and the operating connections for releasing the catches and removing the caps, substantially as described.

3. In a horse detacher, the combination of the vertical clamps arranged in pairs and adapted to receive between them the eyes of shaft irons, and composed of separable sections, coupling bolts secured between the sections of the clamps, the caps arranged on the sections and connecting the same, the cross-pieces connecting the caps in pairs, catches mounted on the caps and securing the same on the clamps, the main operating connection secured to the cross-pieces, and the short operating connections extending from the catches to the main operating connection, substantially as and for the purpose described.

In testimony that I claim the foregoing as my own I have hereto affixed my signature in the presence of two witnesses.

EMMETT LOVELACE.

Witnesses:
SOLOMON BELENEYER,
J. R. PEARCE.